United States Patent [19]

Hasenack

[11] Patent Number: 4,473,519
[45] Date of Patent: Sep. 25, 1984

[54] METHOD OF AGGLOMERATION OF FLY ASH INTO PELLETS

[75] Inventor: Nicolaas A. Hasenack, Castricum, Netherlands

[73] Assignee: Estel Hoogovens B.V., Netherlands

[21] Appl. No.: 428,273

[22] Filed: Sep. 29, 1982

Related U.S. Application Data

[63] Continuation of Ser. No. 232,551, Feb. 9, 1981, abandoned.

[30] Foreign Application Priority Data

Feb. 13, 1980 [NL] Netherlands ......................... 8000882

[51] Int. Cl.$^3$ ............................................. C04B 33/32
[52] U.S. Cl. ........................................ 264/59; 264/64; 264/65; 264/66; 264/125
[58] Field of Search ...................... 264/117, 59, 64, 65, 264/66, 125

[56] References Cited

U.S. PATENT DOCUMENTS

| | | | |
|---|---|---|---|
| 2,946,112 | 7/1960 | Tucker, Jr. et al. | 264/117 |
| 3,196,193 | 7/1965 | Davis et al. | 264/66 |
| 3,850,715 | 11/1974 | Jebens et al. | 264/66 |
| 4,226,819 | 10/1980 | Organesian | 264/66 |

Primary Examiner—James R. Hall
Attorney, Agent, or Firm—Stevens, Davis, Miller & Mosher

[57] ABSTRACT

Fly ash is agglomerated into pellets in order to render it environmentally harmless and suitable for dumping. The fly ash is mixed with water in an unclassified condition and formed into green pellets which are heated in a two-stage heating process. In the first heating stage carbon in the pellets is rapidly gasified while iron present is not reduced below $Fe_3O_4$. In the second heating stage, the pellets are rapidly sintered. The whole heating process is less than 60 minutes and to permit this rapid heating, the pellets must be of sufficient porosity to withstand the rapid gasification of the carbon and the rapid sintering without breaking up.

8 Claims, 2 Drawing Figures

METHOD OF AGGLOMERATION OF FLY ASH INTO PELLETS

This is a continuation of application Ser. No. 232,551 filed Feb. 9, 1981, now abandoned.

BACKGROUND OF THE INVENTION

1. Field of the Invention

The invention relates to a method of agglomerating fly ash into pellets in order to make it more compatible with the environment, particularly when in contact with surface water and ground water, so that the fly ash can be dumped, e.g. as landfill.

2. Description of the Prior Art

Fly ash is produced mainly by the burning of coal. If it is collected, fly ash can be manufactured into other products, but for the most part of it is simply dumped. This dumping takes place most often in old gravel pits or quarries. Generally, this form of dumping has been objected to due to the polluting of ground water and surface water. This pollution is caused by the lixiviation (leaching) of the fly ash, which is manifested in a rise in the pH of the surface water, the solution of heavy metals from the ash and the transport of sulphate ions into the ground water. The extent to which this takes place depends of course heavily on the composition of the fly ash, which can vary greatly from case to case. For the purpose of illustrating this phenomenon only, the following table presents an analysis of the occurrence of several elements in three different types of fly ash from the burning of different sorts of coal. It should be remembered that all these elements are present in the form of oxides or other compounds.

| Al | % | 12.2 | 12.6 | 13.2 |
|---|---|---|---|---|
| Ca | % | 3.2 | 3.2 | 4.1 |
| Mg | % | 1.7 | 1.7 | 2.2 |
| Si | % | 27.8 | 27.9 | 29.9 |
| Ti | % | 0.48 | 0.54 | 0.60 |
| Fe | % | 5.4 | 5.6 | 6.0 |
| $P_2O_5$ | % | 0.4 | 0.4 | 0.4 |
| S | % | 0.28 | 0.30 | 0.31 |
| C | % | 10.2 | 9.3 | 3.2 |
| F | % | 0.024 | 0.024 | 0.025 |
| Na | % | 0.64 | 0.62 | 0.49 |
| K | % | 2.9 | 2.8 | 2.1 |
| Sr | % | 0.08 | 0.08 | 0.08 |
| Cr | % | 0.017 | 0.017 | 0.017 |
| Cu | % | 0.016 | 0.016 | 0.018 |
| Mn | % | 0.076 | 0.076 | 0.104 |
| Pb | % | 0.019 | 0.019 | 0.018 |
| Zn | % | 0.047 | 0.047 | 0.034 |
| Ni | % | 0.015 | 0.016 | 0.018 |
| Hg | ppm | 1.0 | 1.0 | 0.8 |
| Cd | ppm | 4 | 1.0 | 3 |

To illustrate the pollution which is caused by lixiviation of fly ash, 150 g of fly ash with the composition given in the right hand column of the table above was lixiviated at room temperature with 750 g of water of pH 8.5 while stirring continously. The pH rose to approximately 12 within about one or two minutes, rising after further stirring for ten to twenty minutes to a final value of approximately 12.5. One object of the present invention is to provide a limitation to this lixiviation in such a manner that in a similar test the pH will not rise to more than 8-½ to 9 after a much longer time.

It has been previously suggested to sinter fly ash into agglomerates on a travelling grate so that the total surface of the fly ash mass is drastically reduced and a final product is obtained which is less reactive chemically and hence may be termed immobilized. In this known method the firing temperature was in fact continuously held at approximately 1000° C., or at most 1100° C. In order to obtain sufficient cohesion the method also required substantial amounts of lime and bentonite to be added.

It has become apparent that the fly ash in the pellets which were obtained by the method is still not sufficiently immobilized to allow the pellets to be dumped freely. Particularly, an unacceptable amount of heavy metals goes into solution in the ground water in comparison with the surface water, with all the well known harmful consequences for the environment that this involves. It also has become apparent that products of this method show very large variations in homogeneity. Pellets in the upper layer of pellets on the travelling grate were not allowed to reach a temperature higher than for example 1070° C., which meant they attained insufficient cohesion. During the subsequent transport of these pellets a high percentage of very fine and semifine material sieves off, and this material has to undergo another treatment.

Attempts to obtain harder pellets by this method, by raising the firing temperature, have so far failed because the pellets appear to sinter together in the bed on the travelling grate, and during the first phase of the hardening process the pellets already form an impermeable layer, which suffocates the entire firing process.

The prior art also contains a proposal (GS No. 1520335—FMC Corporation) for an alternative use of fly ash, also involving pelletization. The pellets are formed for a specific use in the generation of synthesis gas, in which the pellets are heated and rain down through the gasification zone to supply heat for the endothermic reaction. This specific use requires very particular properties of the pellets, especially high density and high resistance to spalling and attrition. The production of the pellets is therefore carefully controlled. In particular careful sizing of the fly ash (to finer than 200 mesh) is performed before the pellets are made and excess water is extracted from the pellets in a special process. A two stage heating process is described. In the first stage, which may last up to 16 hours (examples given range up from 0.5 hours where success is achieved if bentonite is included as a binder), carbon is removed from the pellets by conversion into gaseous compounds and iron oxides in the pellets are converted to $-Fe_2O_3$. In a second heating stage, sintering is carried out.

This process with its careful preparation of the pellets and its long heating time is clearly wholly unsuitable for the large-scale treatment of fly ash to render it suitable for dumping, in which considerations of high uniform density and high strength are unimportant.

SUMMARY OF THE INVENTON

One object of the invention has been mentioned above. Essentially the main object of the invention is to provide a process of low cost and low energy requirements, which can be used for the treatment of unclassified fly ash to render it sufficiently environmentally harmless for dumping i.e. to achieve a sufficient level of hardness and chemical inactivity.

To this end, it has now been realized that the pellets, which are formed of unclassified fly ash, must have a sufficiently high porosity to allow a two-stage heating process to take place very rapidly e.g. in less than one hour overall.

Thus, the decarburization stage should be performed as quickly as possible at a relatively low temperature, which requires a certain porosity of the pellets to allow rapid gasification of the carbon. This porosity also is required during the sintering stage, in order that in a short period of time a relatively thick skin of the pellet is sintered. The temperature is raised to, or as close as possible to, the softening point in order that the pellet is burnt entirely. Because of a residue of carbon in the pellet the inside temperature may even rise above the softening point and the inside may partially melt. The rapidly formed sufficiently thick sintered skin must then prevent the pellet from breaking up.

In the second heating stage, the firing temperature can be raised to between 1100° and 1300° C., which leads to a much improved immobilization of the heavy metals and reactive compounds in the pellets. The pellets formed can be dumped without hazard to the environment and in addition a high uniformity in their quality can be obtained. These last points have the consequence that only a small percentage of the pellets have an appreciable reactivity, or a variable level of reactivity. The pellets also appear to be much harder, so that there is little powder produced which may have to be sieved off. This high hardness is a consequence of the fact that the pellets are fired at a higher temperature, but are nevertheless not sintered together.

Although firing at a higher temperature is employed the new method is cheaper rather than more expensive in comparison with the known methods. Another factor tending to make the method cheaper is the fact that little or even no lime and/or bentonite need be admixed with the fly ash in order to obtain sufficient cohesion within the pellets.

The carbon and iron oxide compounds which are present in the fly ash are the main factors for the course of the hardening process of the pellets during the firing. Iron is found mainly in the form of $Fe_2O_3$ in the fly ash. In combination with the carbon present in the fly ash, reduction reactions can take place at certain temperatures, by which the $Fe_2O_3$ is sucessively reduced to $Fe_3O_4$, FeO and finally pure iron. On passing through these different reduction phases the oxide layer becomes molten. If one therefore wishes to avoid a molten phase (which causes the pellets to sinter to each other and which therefore causes an impermeable layer in the pellet bed on the travelling grate), as a result of firing at a high temperature, then firing must take place in such a manner that the iron oxides present are not reduced too far. According to the invention, this can now be achieved by heating at a sufficiently low temperature during the first stage, so that reduction of $Fe_3O_4$ to FeO hardly occurs but that nevertheless much or all carbon present in the fly ash combines with oxygen from the air to form gaseous Co and/or Co$_2$ and can escape in that form.

After the pellet has in this way been stripped of the carbon which could act as a reducing agent it can be fired at a higher temperature and therefore to a greater strength.

Preferably in the first heating stage, gas, at a temperature of 600° to 800° C., is passed through a bed of pellets, the gas temperature being controlled in dependence on the temperature of the gas leaving the pellet bed, which should be kept below 1000° C. and preferably below 900° C. As the temperature of the gases which enter the bed is lower, the gas velocities are higher and the thickness of the layer is smaller, so the temperature of the pellets will rise less and less reduction of the iron oxides will therefore occur in the pellets. In addition, however, in order to achieve a rapid removal of the carbon, the temperature of the gases which enter the bed should not be too low. In practice, the process can be controlled very well with a temperature of the gas supplied of from 600° to 800° C. During the combustion of carbon to CO or $CO_2$, heat is released which causes a rise in the temperature of the pellets, especially at the bottom of the bed. The temperature of the withdrawn gas is therefore a good measure for process control.

The process can be operated with increased economy if the fired pellet mass is cooled in two cooling stages, the cooling air from the first step being supplied to the second heating stage and the cooling air originating from the second cooling stage being supplied to the first heating stage. By varying the relative amounts of cooling air through the two cooling stages it is possible to control the temperature of the pellets very well in the two heating stages. A further saving can be made if the gas from the first heating stage is used to dry the formed pellets.

BRIEF INTRODUCTION OF THE DRAWINGS

The preferred embodiment of the invention is described below by way of example with reference to the accompanying drawings, in which:

FIG. 1 is a schematic representation of a travelling grate machine which is used on the preferred process of the invention, FIG. 2 schematically shows the changes of the temperature of the process gases and of the pellets.

DESCRIPTION OF THE PREFERRED EMBODIMENT

Figure 1:
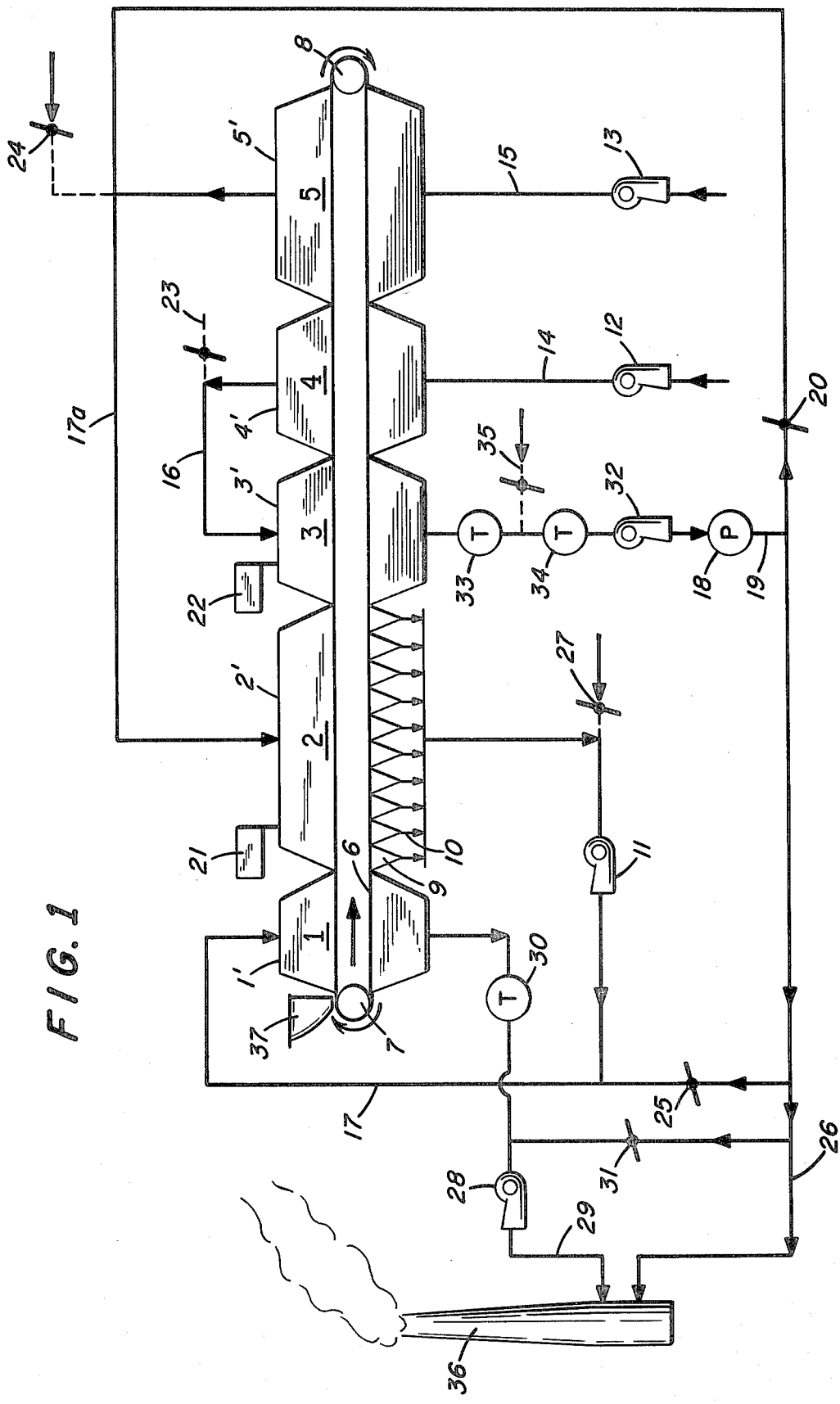

FIG. 1 shows the successive zones 1 to 5 through which a travelling grate 6 is moved over the guide rollers 7 and 8 in the direction shown by an arrow. This travelling grate and the covers 1', 2', 3', 4' and 5' are of a generally known construction which needs no further explanation. In the vicinity of guide roller 7 is a bin 37 for feeding the travelling grate with pellets formed from fly ash. The air flow through pipe 16 and gas flow through pipes 17 and 17a into zones 1, 2 and 3 are in a downward direction, while the air flow through pipes 14 and 15 into zones 4 and 5 is in an upward direction. Zone 1 is a drying zone for the pellets, zone 2 is the first heating zone, zone 3 is the second heating or fitting zone and zones 4 and 5 are two cooling zones.

Figure 2:
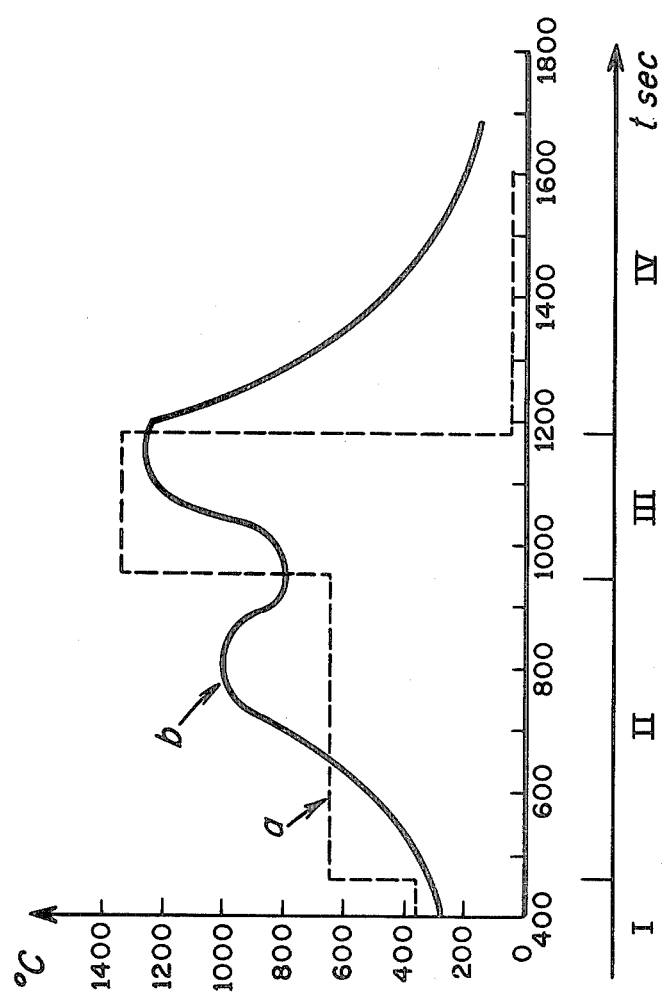

In FIG. 2 the temperature at a fixed point on the travelling grate is plotted (full line b) against time as this point is carried through the travelling grate. This is the mean temperature variation of the pellets in the bottom layer of pellets on the travelling grate. I indicates the drying period, II the first heating period, III the firing period and IV the whole cooling period. FIG. 2 also shows by a broken line a the temperature of the gases or air which are supplied to each of the different zones.

In the preferred process which has been successfully carried out, the pellets were formed from a mixture of fly ash, moistened with 12 to 14% water. A small amount of slaked lime and/or bentonite clay can optionally be added to this mixture, although this did not prove necessary in many cases. The percentage of moisture required appears to a certain extent to be dependent on the type of fly ash, but in practice it is easy to find the right amount by experiment. It is important that the mixture is mixed intensively. The dry fly ash can, for example, first be homogenized for one minute and then, with a regular addition of water, mixed and homogenized for a further minute. The formation of the pellets takes place on a standard pelletizing disc. As is indicated in FIG. 2, the pellets formed were first dried for approximately 450 seconds with gas at a temperature of approximately 350° C. on the travelling grate, after which they were supplied to first heating zone 2. In this zone the temperature of the gases supplied was adjusted to approximately 650° C., so that the temperature of the pellets first gradually rose to this value, and then rose above it as a consequence of the combustion of the carbon monoxide which was formed in the pellets. At this point it must be ensured that the temperature does not rise above approximately 900° C. or does so only for a short time, so that hardly any reduction of $Fe_3O_4$ to FeO occurs.

In FIG. 1 at 10 the temperature of the gases which pass out of the first heating zone are measured in the compartments 9.

With the aid of the adjustable fan 11 it is possible to vary the flow of gas to zone 2 so that the maximum temperature is reached in a predetermined compartment 9. The maximum temperature value is influenced by the flow of gas and is in addition dependent on the chosen input temperature of the gas, the chosen thickness of the layer of the fly ash pellets on the travelling grate and on the concentrations of combustable carbon and readily reducible metal oxides. At the end of the first heating zone there is hardly any carbon left in the pellets, so that in the subsequent oxidising firing of the pellets no further reduction of $Fe_3O_4$ can take place.

In zone 3 air is supplied at a temperature of approximately 1300° C. so that the pellets are fired at a temperature which rises to approximately 1250° C. At that temperature strong pellets are obtained which do not have a tendency to sinter together. After leaving firing zone 3 the pellets are cooled quickly in the two successive zones 4 and 5.

FIG. 1 also shows how the heat generated during the process can be used as much as possible, by circulating it with various controls which will be described.

Adjustable fans 12 and 13 blow in ambient air via pipes 14 and 15 to the two cooling zones 4 and 5, from which the heated air is conducted via pipes 16 and 17 to the firing zone 3 and the first heating zone 2 respectively. By means of a pressure measurement in the first heating zone 2 the throughput of the fan 13 is adjusted.

The amount of gas exiting from firing zone 3 which can be supplied to the first heating zone 2 is controlled by valve 20 dependent upon the ratio of pressures in zone 5, and pipe 19. An auxiliary burner 21 ensures that the required temperature (between 600° and 900° C.) is reached in zone 2.

A pressure measurement in the firing zone 3 is used to adjust the throughput of fan 12. Auxiliary burner 22 ensures that the required temperature (between 1100° and 1300° C.) is reached in firing zone 3.

It is useful to limit the pressure in zones 4 and 5 at which the cooling air enters the cooling zones 4 and 5 respectively, by opening the inlet valves 23 and 24 respectively in accordance with the required pressures in the heating zones.

The gases which come from the adjustable fan 11, as well as part of the unused gases from zone 3 are supplied to the drying zone 1. Adjustment of the addition of the gases from zone 3 to the drying gases occurs by alteration of the control valve 25 in dependence on the value of temperature measurement in zone 1. The unused gas from zone 3 is supplied via a pipe 26 to a stack.

It is useful to limit the maximum temperature in fan 11 by means of inlet valve 27. The pressure measurement in the drying zone 1 is used to adjust the throughput of the adjustable fan 28 which transports these gases via a pipe 29 to the stack 36. The thermometer 30 registering the temperature at the inlet end of fan 28 can be limited by means of inlet valve 31.

The adjustable fan 32 finally exhausts the gas through the firing zone 3. The throughput of this fan is adjusted by means of a temperature sensor 33. It is useful to limit the temperature of the gases introduced into fan 32 or registered by thermometer 34 by means of an inlet valve 35.

The speed of the travelling grate 6 is adjusted by the weight per unit time of the green pellets supplied. Dust collectors may be present in the pipes to the fans 11, 28 and 32.

What we claim is:

1. A method of preventing the lixiviation of fly ash when in contact with ground or surface water, comprising (a) heating a porous pelletized mixture of 12 to 14% water and fly ash containing carbon and iron in a first heating stage until reducing the iron in the pellets to an oxidation state no lower than $Fe_3O_4$ and gasifying the carbon contained therein, (b) heating the pellets in a second heating stage at a higher temperature to the softening temperature of the pellet composition to sinter the pellets and form a thick skin thereon and (c) cooling the sintered pellets.

2. The method of claim 1, wherein the overall time of the heating process of the pellets from initial heating to substantially final cooling is less than 60 minutes.

3. The method of claim 2, wherein the said overall time of the heating process is in the range 30 to 60 minutes.

4. The method of one of claims 1 to 3, wherein during said first heating stage air at a temperature in the range 600° C. to 800° C. is passed through a bed of the pellets, the amount of this air passing through said bed of pellets being adjusted in dependence on the temperature of the air leaving the bed of pellets so as to keep the temperature of the air leaving below 1000° C.

5. The method of one of claims 1 to 3, wherein in said second heating stage, the pellets are fired to a temperature in the range 1000° C. to 1300° C.

6. The method of claim 1 which is performed continuously and wherein after the said second heating stage, the pellets are cooled by passing air over them in two cooling stages, the air passed over the pellets in the first cooling stage being supplied subsequently to the said second heating stage to heat the pellets therein and the air passed over the pellets in the second cooling stage being supplied subsequently to the said first heating stage to heat the pellets therein.

7. A method according to claim 6, wherein the air leaving said first heating stage after passing through a bed of the pellets is used to dry the green pellets after their formation.

8. A method of preventing the lixiviation of fly ash when in contact with ground or surface water, comprising the steps of (i) heating porous pellets formed of fly ash containing carbon and iron and 12 to 14% water at a temperature sufficient to cause rapid removal of the carbon present in the fly ash pellets as gaseous compounds while substantially preventing reduction of the iron present in the pellets to an oxidation state below $Fe_3O_4$ and (ii) thereafter heating the pellets to a higher temperature which is substantially the softening temperature of the pellet composition to sinter at least a thick outer portion of each pellet and form a thick skin thereon, said heating steps (i) and (ii) having a combined duration of less than 60 minutes, and said pellets being able to withstand said rapid removal of the carbon and said rapid sintering without destruction of the pellets.

* * * * *